June 23, 1970 M. J. GILMARTIN, JR., ET AL 3,517,173

DIGITAL PROCESSOR FOR PERFORMING FAST FOURIER TRANSFORMS

Filed Dec. 29, 1966 7 Sheets-Sheet 1

INVENTORS M. J. GILMARTIN, JR.
R. R. SHIVELY
BY
ATTORNEY

DIGITAL PROCESSOR FOR PERFORMING FAST FOURIER TRANSFORMS

Filed Dec. 29, 1966

7 Sheets-Sheet 5

| COUNTER BIT | Tn-1 | Tn-2 | | T2 | T1 | T0 | |
|---|---|---|---|---|---|---|---|
| ASSIGNED WEIGHT | $\frac{\pi}{2^n}$ | $\frac{\pi}{2^{n-1}}$ | | $\frac{\pi}{8}$ | $\frac{\pi}{4}$ | $\frac{\pi}{2}$ | INTERP. |
| | 0 | 0 | ------ | 0 | 0 | 0 | 0 RADIANS |
| SEQUENCE OF VALUES ↓ | 0 | 0 | | 0 | 0 | 1 | $\frac{\pi}{2}$ RADIANS |
| | 0 | 0 | | 0 | 1 | 0 | $\frac{\pi}{4}$ RADIANS |
| | 0 | 0 | | 0 | 1 | 1 | $\frac{3\pi}{4}$ RADIANS |
| | 0 | 0 | | 1 | 0 | 0 | $\frac{\pi}{8}$ RADIANS |
| | 0 | 0 | | 1 | 0 | 1 | $\frac{5\pi}{8}$ RADIANS |
| | ¦ | ¦ | | ¦ | ¦ | ¦ | |
| | 1 | 1 | ------ | 1 | 1 | 1 | $\pi\sum_{i=1}^{n}\left(\frac{1}{2}\right)^{i}=\pi\left(1-\frac{1}{2^n}\right)$ RADIANS |

3,517,173
DIGITAL PROCESSOR FOR PERFORMING FAST FOURIER TRANSFORMS

Michael J. Gilmartin, Jr., Mine Hill, and Richard R. Shively, Morristown, N.J., assignors to Bell Telephone Laboratories, Incorporated, Murray Hill and Berkeley Heights, N.J., a corporation of New York Filed Dec. 29, 1966, Ser. No. 605,768
Int. Cl. G06f 7/38
U.S. Cl. 235—156 17 Claims

ABSTRACT OF THE DISCLOSURE

A data processing system for generating complex Fourier series coefficients corresponding to at least one time-varying input signal wherein an arithmetic unit iteratively forms successive sequences of Fourier series coefficients based on trigonometric function values and previously generated coefficients selected by an indexing circuit.

This invention relates to signal processing apparatus and more particularly to apparatus for analyzing the frequency spectrum of signals. Still more particularly, this invention relates to a digital processor for analyzing the spectrum of signals.

There are many applications where it is necessary to determine the frequency content of signals. These applications are in fields varying from cardiogram analysis to seismographic analysis as well as in the more typical communication and control areas. In some cases it is possible to obtain a permanent record of the signal and then perform a spectral analysis of this record using a general-purpose digital computer in a manner prescribed, for example, in the monograph entitled The Measurement of Power Spectra by R. B. Blackman and J. W. Tukey, published by John Wiley and Sons, New York, 1962. Using this type of approach, a high degree of accuracy is possible and the results can be smoothed to eliminate any anomalies. Because of the iterative nature of this process, results are often obtained only after a considerable processing period.

Often, however, it is necessary to obtain frequency spectrum information in real time. That is, a running indication of the spectrum is required while the signal is presented. One technique that has been used in the past to obtain a real-time estimate of the distribution of frequencies in a signal requires a number of narrow-band-pass filters each tuned to a different portion of the frequency range of the signal. By sampling the outputs of each of these filters (or some smoothed version of the outputs), an indication of the power contained in the signal over each narrow band can be obtained. It should be noted, however, that a large number of complex precision filters is required if a high degree of resolution is to be obtained in a system of this type. Thus only the largest and most expensive systems can make full use of this technique.

There have been many attempts in the past to simplify the mathematical techniques associated with the classical Fourier transform and thereby to provide simplified spectral analysis. In a paper entitled "An Algorithm for the Machine Calculation of Complex Fourier Series," Mathematics of Computation 19, 297–301, 1965; J. W. Cooley and J. W. Tukey presented a simplified algorithm for calculating Fourier series coefficients on a digital computer. Through a judicious choice of grouped summations, Cooley and Tukey were able to effect a considerable economy in the number of additions and multiplications needed to determine the desired coefficients. However, because most general-purpose computers are not equipped to perform any large number of parallel arithmetic operations, even the reduced number of operations required by the basic algorithm of Cooley and Tukey proved to be too great to perform real-time spectral analysis in many cases. In addition, the very cost of using a general purpose computer to perform real-time spectral analysis is generally prohibitive.

The present invention includes means for implementing the Fourier transform algorithm of Cooley and Tukey in the form of an efficient and highly accurate digital processor known as a Fast Fourier Transform Processor (FFTP). High-speed complex-arithmetic logic circuits employed by the processor allow necessary computations to be performed in real time for a broad class of input signals. Automatic scaling means are included to simplify arithmetic operations while maintaining required accuracy. Memory is efficiently utilized by selectively replacing operands by results, and by judiciously assigning memory locations to operands. These and other objects, features and operating characteristics of the present invention will be discussed in the detailed description to follow, wherein:

FIGS. 1*a–d* show the changing contents of the memory unit after successive iterations as performed by the FFTP.

FIG. 2 shows a broad block diagram of an FFTP according to the present invention.

FIGS. 3*a* and 3*b* show respectively more specific block diagrams of a complex arithmetic unit and associated trigonometric function generator according to the present invention.

Figure 7A:
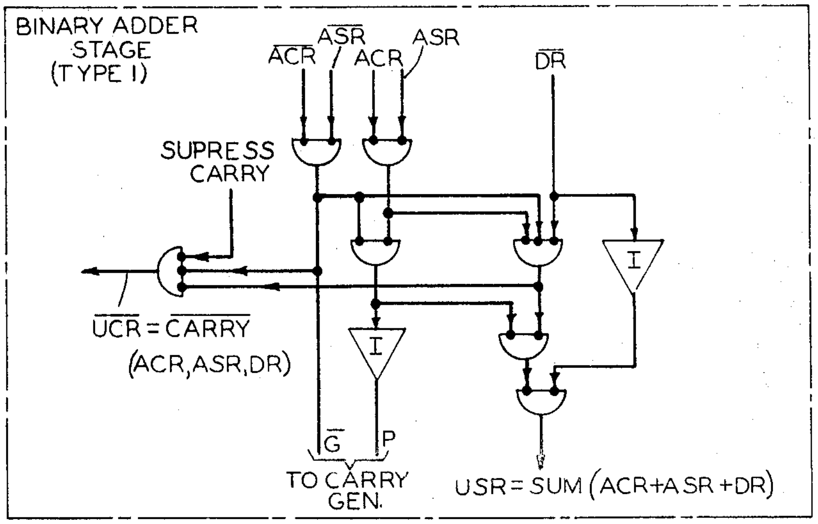
Figure 7B:
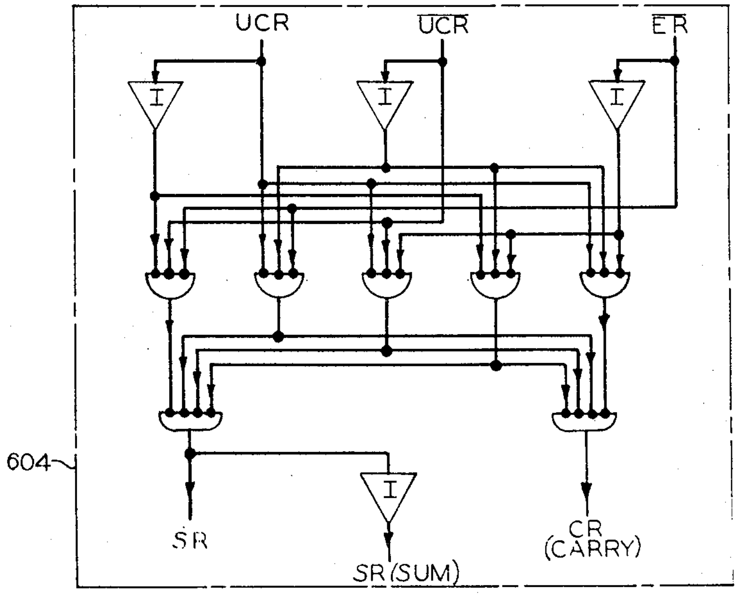
Figure 6:
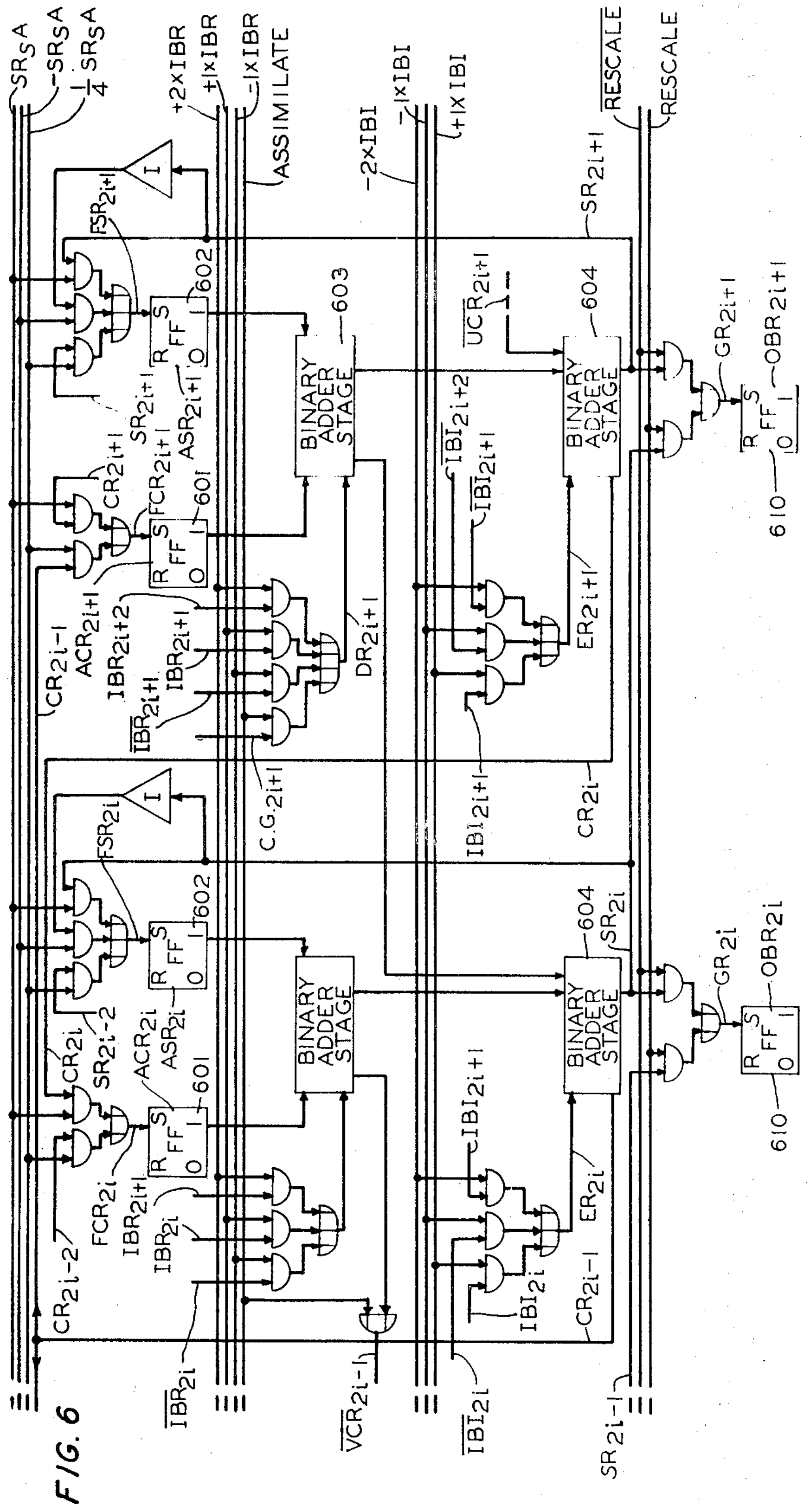
FIG. 6 shows two typical digit positions in one version of a complex arithmetic unit.

FIGS. 7*a* and 7*b* show two adder circuits employed in the circuit of FIG. 6.

Figures 8, 9:
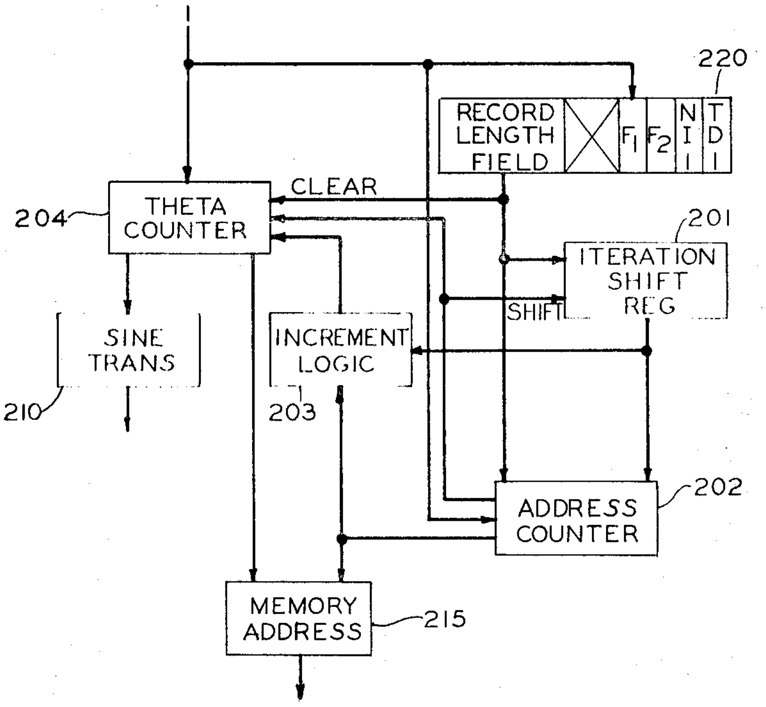

FIG. 8 shows a block diagram of indexing circuitry according to the present invention.

FIG. 9 is a table of trigonometric arguments generated by the circuit of FIG. 8.

Figure 10:
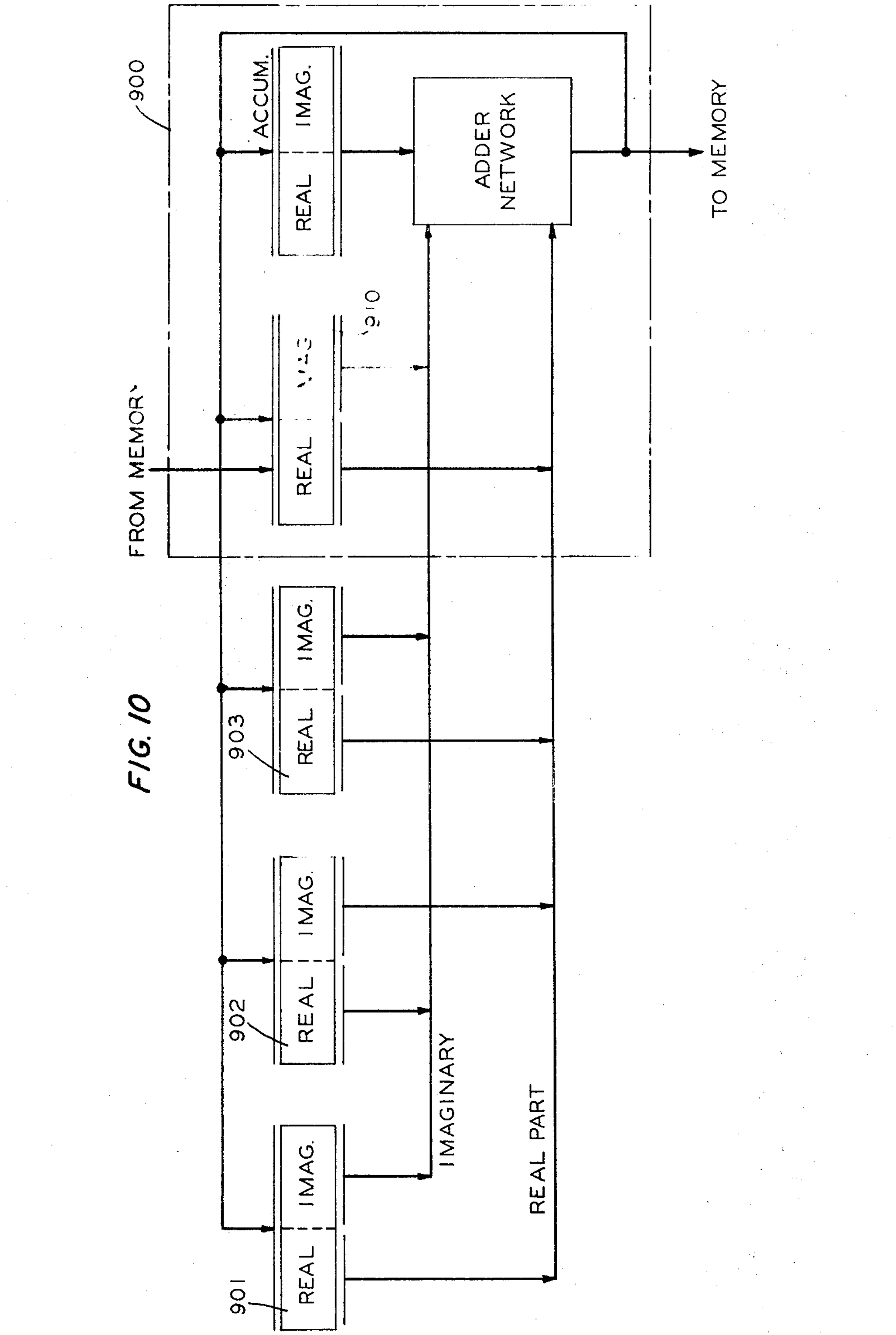

FIG. 10 is an embodiment of the present invention arranged to operate in the base-4 mode.

The following section will provide the mathematical and theoretical background necessary for an understanding and appreciation of the present invention. Further reference to the above-referenced Cooley-Tukey paper may also be of some use in this regard.

BACKGROUND AND THEORETICAL CONSIDERATION

A periodic function $f(t)$ may be represented in a Fourier series by $$f(t)=\sum_{n=-\infty}^{\infty} D(n)\exp.\left(j\frac{2\pi}{T}nt\right) \quad (1)$$

where $j=\sqrt{-1}$
T=the period of $f(t)$ and the complex coefficients D(n) are given by $$D(n)=\frac{1}{T}\int_{t_0}^{t_0+T} f(t)\exp.\left(-j\frac{2\pi}{T}nt\right)dt \quad (2)$$

If the value of $f(t)$ is given only at N equi-spaced sample points in each interval of length T, then an approximation to D($n$) may be obtained by relacing the integral in Eq. 2 by a summation and the differential $dt$ by the increment $T/N$. Using an asterisk to identify approximations relating to $f(t)$ and taking $t_0=0$ for convenience, the approximation $D^*(n)$ takes the form $$D^*(n)=\frac{1}{N}\sum_{m=0}^{N-1} f\left(\frac{mT}{N}\right) \exp.\left(-j\frac{2\pi}{N}nm\right) \qquad (3)$$

From Eq. 3 it is apparent that $$D^*(n)=D^*(n+N) \qquad (4)$$

i.e., sampling forces the approximating distribution of harmonics to be periodic regardless of the actual spectrum of $f(t)$. Therefore, if D* is to be a reasonable approximation to D, the D($n$) for $n$ outside the interval $$\frac{-N}{2}<n<\frac{N}{2}$$

must be assumed to be negligible. With this assumption, $f(t)$ in 1 may be approximated by $f^*(t)$ where $$f^*(t)=\sum_{n=0}^{N-1} D^*(n) \exp.\left(j\frac{2\pi}{T}nt\right) \qquad (5)$$

The periodicity of D* allows the summation limits given in 5 to be used rather than the conventional symmetrical limits $-N/2$ and $N/2$. As a result, Eq. 5 differs in form from 3 only by a multiplicative constant and the sign of the exponent. That is, $$f^*\left(m\frac{T}{N}\right)=\sum_{0}^{N-1} D^*(n) \exp.\left(j\frac{2\pi}{N}nm\right) \qquad (6)$$

If $f(t)$ is a complex function of the real variable $t$, it may be expressed in terms of two real function $f_1$ and $f_2$ as $$f(t)=f_1(t)+jf_2(t) \qquad (7)$$

The Fourier coefficients D*($n$) corresponding to this complex $f$(t) are expressible as $$D^*(n)=D_1^*(n)+jD_2^*(n) \qquad (8)$$

where $D_1^*$ and $D_2^*$ are the (approximate) coefficients for $f_1$ and $f_2$ respectively. If ~ denotes complex conjugate, it is apparent from 3 that $$D_1^*(n)=\tilde{D}_1^*(N-n)$$

and $$D_2^*(n)=\tilde{D}_2^*(N-n) \qquad (9)$$

Therefore Equation 8 may be modified to take the form $$D^*(N-n)=\tilde{D}_1^*(n)+j\tilde{D}_2^*(n) \qquad (10)$$

or $$\tilde{D}^*(N-n)=D_1^*(n)-jD_2^*(n) \qquad (11)$$

Equations 8 and 11 may be combined to yield $$D_1^*(n)=\frac{1}{2}(D^*(n)+\tilde{D}^*(N-n)) \qquad (12)$$

$$D_2^*(n)=\frac{1}{2j}(D^*(n)-\tilde{D}^*(N-n)) \qquad (13)$$

One form of the Cooley-Tukey algorithm will now be heuristically derived. For this derivation $f(t)$ will be taken to be a periodic function with period T. For convenience, a given period will be assumed to begin at time $t=0$ and extend to $t=T$. The period will be divided into K intervals, each of length $T/k$.

Fourier coefficients F($n$) (the asterisks will henceforth be eliminated) will be calculated for $f(t)$ based on $K/2$ samples taken at $t=0$, $2T/k$, $4T/K$ . . . $(K-2)T/K$. It proves convenient to define a new function $g(t)$ by $$g(t)\equiv f(t+Tk)$$

The Fourier coefficients G($n$) corresponding to $g(t)$ can then be calculated based on samples of $f(t)$ taken at $t=T/K$, $3T/K$ . . . $(K-1)T/K$. That is F($n$) and G($n$) will each be Fourier coefficients corresponding to $f(t)$ based on separate but interleaved sets of $K/2$ samples. For notational simplicity, the following definitions apply:

$$f'(k)=f\left(k\frac{T}{K}\right)$$

$$g'(k)=g\left(k\frac{T}{K}\right)$$

$$W=\exp.\left(-j\frac{2\pi}{K}\right)$$

Using Equation 3 with record length N replaced by $K/2$, the F($n$) and G($n$) may be expressed as:

$$F(n)=\frac{2}{K}\sum_{m=0}^{\frac{K}{2}-1} f'(2m)W^{2nm} \qquad (14)$$

$$G(n)=\frac{2}{K}\sum_{m=0}^{\frac{K}{2}-1} g'(2m)W^{2nm} \qquad (15a)$$

$$G(n)=\frac{2}{K}\sum_{m=0}^{\frac{K}{2}-1} f'(2m+1)W^{2nm} \qquad (15b)$$

If D($n$), $n=0$, 1, 2 . . . $K-1$, is used to denote the Fourier coefficients for the combined set of K samples, i.e., $$D(n)=\frac{1}{K}\sum_{m=0}^{K-1} f'(m)W^{nm} \qquad (16)$$

then the F and G coefficients may be used to evaluate D as follows:

$$D(n)=\frac{1}{2}[F(n)+W^nG(n)] \qquad (17a)$$

$$0\leq n\leq\frac{K}{2}-1 \qquad (17b)$$

$$D\left(n+\frac{K}{2}\right)=\frac{1}{2}[F(n)-W^nG(n)]$$

Equation 17$b$ follows from the observations that $$W^{\frac{K}{2}}=-1$$

$$F\left(n+\frac{K}{2}\right)=F(n)$$

and $$G\left(n+\frac{K}{2}\right)=G(n)$$

Equations 17$a$ and 17$b$ demonstrate the basic operation in the binary formulations of the Cooley-Tukey algorithm, namely, the combining of the Fourier coefficients of two interleaved sample records to yield one set of coffiecients corresponding to twice the sampling frequency. The operation is applied to computing Fourier coefficients for a finite (say N) sample record by regarding each sample as an independent one-term record. Because of the assumed periodicity, the sampling interval for each of these one-sample records is the period T of the sampled function. The Fourier coefficient for each such one-sample record is the sample value itself (e.g., Equation 3 with $N=1$). Equations 17$a$ and 17$b$, with $K=2$, may be used to pair samples, i.e., series, displaced by $T/2$, half the sampling period of the one-sample records. With $K=4$, Equations 17*a* and 17*b* may be applied to the pairing of the two-term series, resulting in $N/4$ series, each with four coefficients and based on samples spaced uniformly at intervals of $T/4$, etc. If N (the size of the total record) is a power of 2, the described procedure may be applied recursively to yield one combined N-term Fourier series for the N samples. Since the series' length is doubled with each iteration, the number of iterations required is $\log_2 N$. Because the total number of coefficients generated during each iteration is N ($N/2^i$ series each $2^i$ in length), and one complex multiplication ($W^n \cdot G(n)$ in Eqs. 17*a*, 17*b*) is required for each pair of coefficients formed during any iteration, the total number of complex multiplications is $(N/2)\cdot\log_2 N$. For large N, the fraction of these multiplications which are simplified by either a zero real or imaginary portion of W approaches $3/\log_2 N$. This follows from the fact that the angle associated with W is a multiple of $\pi/2$ for all of the first two iterations, half of the third, one quarter of the fourth, etc.

The original Cooley-Tukey description points out that processing an N-sample record requires computer memory capacity for N complex numbers, rather than distinct storage for the N operands plus the N results of an iteration. This is because each of a given pair of operands F(*n*) and G(*n*) in Eqs. 17 is used to form only one pair of results, thus the resultant pair may overwrite the operands.

FIG. 1 shows a possible memory arrangement for calculating Fourier coefficients by the Cooley-Tukey method with $N=8$. FIG. 1*a* shows $N=8$ samples of an input record stored sequentially in a left-to-right array designated $A_0$. The notation D(I/J,K . . . ) denotes the Ith coefficient corresponding to the sample record consisting of samples J,K . . . .

In the first iteration samples displaced by half of the total record length (and therefore by $N/2=4$ memory locations) are combined using Eqs. 17 to generate two-term Fourier series. Thus D(0|0,4) and D(1|0,4) are formed from the elements in locations 0 and 4 and the results can then be restored in those locations because samples 0 and 4 will not again be required. Similarly, the other first-iteration elements are generated and stored in array $A_1$, shown in FIG. 1*b*. Subsequent iterations then are performed and yield arrays $A_2$ and $A_3$. Array $A_3$ is the final result. Except for ordering, that array contains the results that would be arrived at by more conventional methods only after a considerably greater amount of arithmetic.

In general, after the *k*th iteration, all like-numbered harmonic coefficients are grouped, but the $2k$ groups of harmonic coefficients occur in an order described in reversing the *k* binary digits necessary to index them. For the example shown in FIG. 1, the coefficients stored in memory after the third iteration occur in an order described by reversing a three binary digit index. Since location 0 is associated with 0=000, the first element need not be reordered. The coefficient in location 1=001, however, must be transferred to location 100=4. Likewise, the coefficient in location 2=010 in being transferred to location 010=2 goes nowhere, while that in location 3=011 moves to 110=6, and so forth. The sequence of exponent values used during each iteration conforms with this pattern, since the power of W in Equation 17 is identically the harmonic number.

To include provisions for the efficient use of memory in the algorithm, it is convenient to denote the (complex) results of the *i*th iteration as a linear array Ai(K), $K=0,1 \ldots N-1$. $A_0$ is the N-sample record to be processed, and $N=2^m$. Let $k_n$ denote the $2^n$ weight digit when index K is expressed in binary form, i.e., $$K=\sum_{n=0}^{m-1} k_n \cdot 2^n$$

It should be noted that the index K does not refer to the number of the harmonic coefficient. The relations given by 17 may then be expressed as a recursive relation by $$A_{i+1}(k_{m-1}, k_{m-2} \ldots k_0) = A_i(k_{m-1} \ldots k_{m-i}, 0, k_{m-i-2} \ldots k_0) + (-1)^{k_{m-i-1}} A_i(k_{m-1} \ldots k_{m-i}, 1, k_{m-i-2} \ldots k_0) \exp(j\theta) \quad (18)$$

where $$\theta = 2^{-i-1}\pi 2^i k_{m-i} + 2^{i-1} k_{m-i+1} + \ldots + 2^{\circ} k_{m-1}$$

To reiterate, $A_{j+1}(k_{m-1}, k_{m-2} \ldots k_0)$ is the $K^{th}$ element in the array resulting from the $(i+1)^{th}$ iteration where $K=(k_{m-1}, k_{m-2} \ldots k_0)$ is a binary number. The use of binary digits for K facilitates the pairing of array elements to be combined and which are separated by $$2^{m-i-1}=N/2^{i+1}$$

memory locations.

The number of the harmonic coefficient represented by a particular $A_i$ is found by reversing the binary digit field $k_{m-1}, k_{m-1}$. This reversed field appears in the expressions for $\theta$. In particular, after the last iteration ($i=m$), the entire *m* binary digits of index K are reversed to identify the number of Fourier coefficients in the $K^{th}$ position.

The method described above is the so-called binary version, i.e., N is an integer power of 2 and two sample records are interleaved. A useful variant of this method involves the interleaving of 4 sample records instead of 2. This latter technique has the advantage of reducing the number of multiplication required by 25 percent compared to the binary method. Further, if ample storage is available, only half as many memory references need be made.

The description below will be in terms of the binary form of the algorithm, but it will be understood that an equivalent base-4 system could easily be constructed on the basis of the binary implementation.

GENERAL METHOD OF OPERATION

Figure 2:
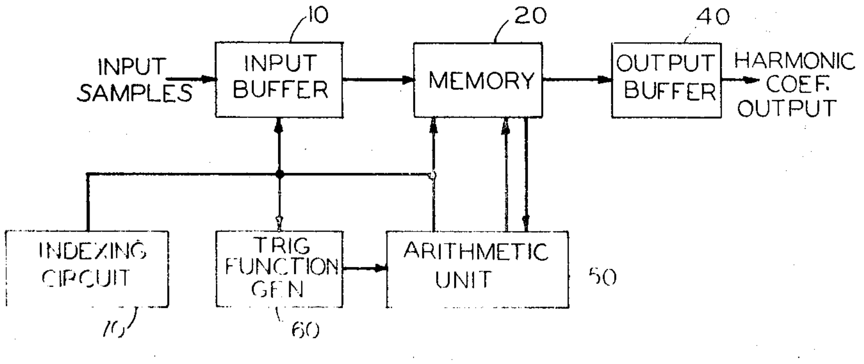

FIG. 2 shows a block diagram of a Fast Fourier Transform Processor (FFTP) according to the present invention which efficiently implements the Cooley-Tukey algorithm discussed above. This simplified illustration of one embodiment of the present invention will now be described in broad outline. Succeeding sections will describe each of the several aspects of the present invention in more detail.

It is assumed that each input signal will already have been effectively segmented into records T seconds long, the first of which is assumed to start at $t=0$. To simplify the preliminary discussion, a single input signal will be assumed. During each T second interval $N=2^m$ samples of the input signal are obtained and presented sequentially to the input buffer 10. After being reordered or converted from serial to parallel form by input buffer 10 (when necessary) the input samples are transferred to the system memory 20. Input buffer 10 also provides any functions related to rate differentials or timing that may be necessary to effect the transfer. The information stored in memory 20 then corresponds to that in FIG. 1*a*, i.e., it constitutes the array $A_0$, or the results of the "zeroth" iteration. Of course the size of the array need have no relation to that shown in FIG. 1*a*.

Figure 1A:
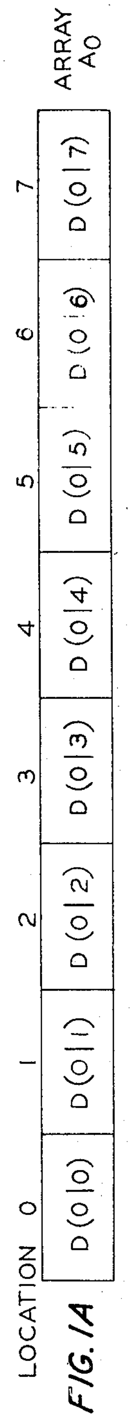
Figure 1B:
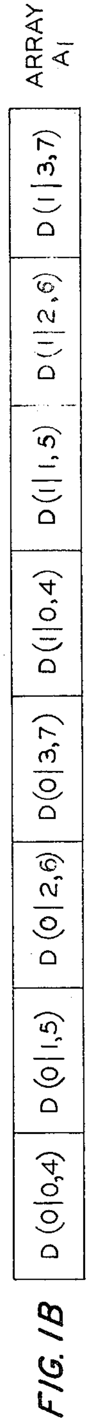
Figure 1C:
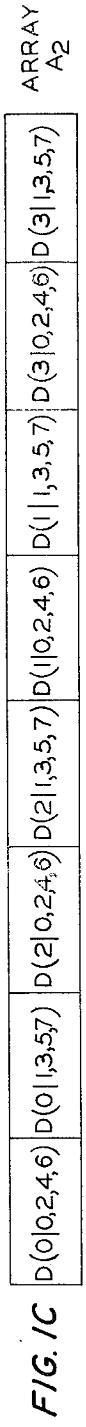
Figure 1D:
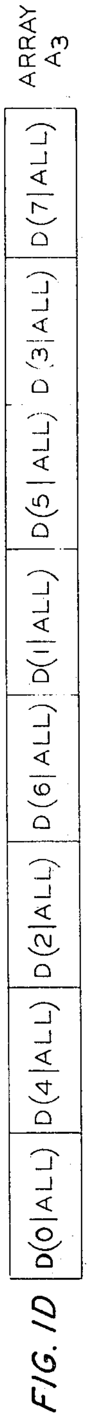

The arithmetic unit 50 then operates on the stored samples and on trigonometric function values supplied by the trigonometric function generator 60 in accordance with Eq. 18 to calculate an array of results corresponding to array $A_1$ in FIG. 1*b*. The indexing circuit 70 directs the ordering of operands supplied by the trigonometric function generator 60 and the memory 200 and also directs the placement of results back in the memory 20.

The elements of array $A_1$ stored in memory 20 then become operans and together with values from the trigonometric function generator 60 generate array $A_2$.

This iterative prcoess continues until the $m$th array $A_m$ is stored in memory 20. This array contains the final results of the Fourier analysis, which results are then read out by way of output buffer 40 which performs any required reordering, parallel-to-serial-conversion, speed change, etc.

Because the elements of each array are used for only one subsequent iteration, it is possible to limit total memory capacity for computational results to that required for only a single array. That it, results of a particular calculation replace in memory 20 the operands from which they were partially derived. This replacement is performed under the control of the indexing circuit 70.

COMPLEX ARITHMETIC UNIT—CONFIGURATION

The basic arithmetic operation performed in generating successive array element is, according to Eq. 18 a complex multiplication followed by a complex addition, i.e., $$A_{i+1}(J)=A_i(J)+A_i(K)\ \exp(j\theta) \qquad (19)$$

From the symmetries of Eq. 18 it can be seen that $$A_{i+1}(K)=A_i(J)+A_i(K)\ \exp[j(\theta+\pi)]$$

or $$A_{i+1}(K)=2A_i(J)-A_{i+1}(J) \qquad (20)$$

If operands are accessed sequentially with $A_i(K)$ preceding $A_i(J)$, Eq. 20 indicates how the second operand is combined with the first result to reduce the number of complex multiplications by a factor of one-half. If the real and imaginary parts of the elements of $A_i$ are denoted as $AR_i$ and $AI_i$ respectively, Eq. 19 may be rewritten to explicitly indicate the four real multiplications required in forming the single complex product $$A_i(K)\cdot\exp(j\theta)$$

Thus $$AR_{i+1}(J)=AR_i(J)+AR_i(K)\ \cos\theta=AI_i(K)\ \sin\theta \qquad (21a)$$

$$AI_{i+1}(J)=AI_i(J)+AI_i(K)\ \cos\theta+AR_i(K)\ \sin\theta \qquad (21b)$$

The present invention includes an arthimetic unit for executing the arithmetic operations implied by Eqs. 21*a*, *b*. One embodiment of this arithmetic unit is shown in block diagram form in FIG. 3*a*. Actually, these elements are advantageously duplicated to provide for the simultaneous computation of the real and imaginary parts of $A_{i+1}(J)$ according to Eqs. 21*a* and 21*b* respectively. This mode of operation with two separate arithmetic units is preferable because it eliminates the need for storage of $AR_i(K)$ and $AI_i(K)$ that would be required if $AR_{+i}(J)$ and $AI_{i+1}(J)$ were to be separately calculated.

Figure 3A:
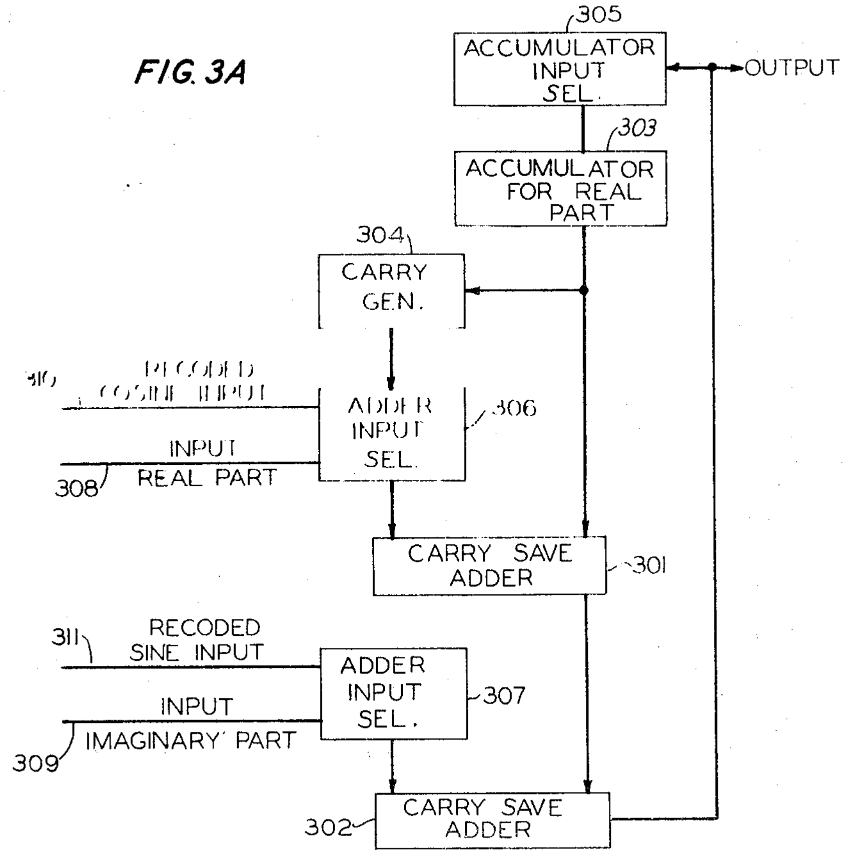

The circuit of FIG. 3*a* includes 2 parallel carry-save adders 301 and 302 of the type described, for example, in Backman et al., "Developments in the Logical Organization of Computer and Control Units" Proc. IRE, volume 49, January 1961, pp. 60–61, and references cited therein. These adders provide rapid accumulation of partial sums as required in multiplication circuits by separately storing carry digits. These carry digits are later assimilated into the accumulated partial sums to produce the desired result.

FIG. 3*a* also shows an accumulator 303 of standard design and an associated carry generator 304. Selectors 305, 306, and 307 are logic blocks each capable of selecting as its output one of its several inputs or certain simple functions (including multiples) of its inputs.

For purposes of this immediate discussion, the arithmetic loop shown in FIG. 3*a* will be assumed to be that for performing the operations required by Eq. 21*a*. An equivalent circuit can be provided to simultaneously perform the operations required by Eq. 21*b*. Input lead 308 carries the real input $AR_i(K)$ from memory to adder input selector 306 whence it is supplied to adder 301 as a multiplicand. Input lead 309 likewise carries imaginary input $AI_i(K)$ to selector 307 where it is selected at the appropriate time to be a multiplicand input for adder 302. Leads 310 and 311 provide paths to their respective selectors 306 and 307 for recoded cosine and sine multiplier values derived from trigonometric function generator 60 in FIG. 2. Of course, there are some applications where recoding of the multipliers is not necessary or desirable. More will be said below about the advantages of recoding the trigonometric function values. A similar role is performed by leads 308–311 when the arithmetic unit is used to implement Eq. 21*b* except then lead 308 is connected to selector 307 instead of selector 306 and lead 309 is connected to selector 306 instead of selector 307.

The use of two cascaded carry-save adders allows multiplicand multiples of equal significance to be accumulated in a single operation. Thus, for example, a partial product formed by multiplying $AR_i(K)$ by a digit of cos $\theta$ is combined in a single operation with a partial product formed by multiplying $AI_i(K)$ by a digit of sin $\theta$. Other advantages of cascading adders in this manner to form the sum of products relative to using a single adder circuit are several.

First, there is a reduction in time delay. Since the propagation delay, measured in logic circuit nodes, of the equivalent of a double rank flip-flop in an arithmetic loop is approximately twice the delay time of a binary adder stage, the cascading of two adders increases the percentage of time attributable to logic elements actually performing arithmetic by 50 percent relative to an arithmetic loop with only a single adder. If further time is allowed for gating signal distribution during each step, the improvement is even greater.

Second, there is no need for time or equipment to temporarily store the first product developed while the second is being formed.

Third, the numerical accuracy achieved is the rounded sum of products rather than sum of products, each rounded individually prior to addition. This is a result of adding multiplicand multiples of equal signficance from the two products to be summed before the partial product sum is right shifted. In this way, contributions from the truncated part of the two products are correctly reflected in the result obtained. Rounding this result limits the maximum truncation error to ½ relative to the low order digit position; forming rounded products in sequence (to the same number of digit positions) would allow a maximum truncation error asymptotic to 1.

A by-product of using two adders in cascade is the simplification of assimilating a number into canonical form from the stored carry form, as will be described below.

Figure 3B:
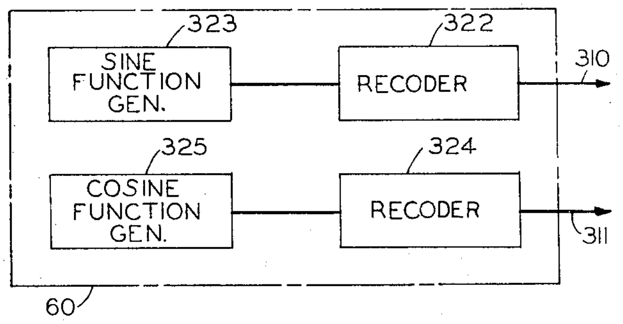

FIG. 3*b* shows in block diagram form one possible embodiment of the trigonometric function generator 60 shown in FIG. 2. The sine and cosine function generators 323 and 325 respectively may conveniently be recirculating shift registers or other separate memory devices. Alternately, they may actually be numerical values stored in part of the main memory. A method of efficiently accessing these values will be presented below under Sequence of Trigonometric Coefficients. Recoders 322 and 324 may take many forms, including a mere conduction path for the case where no recoding is to be effected. A particularly desirable recording circuit will be described below.

COMPLEX ARITHMETIC UNIT—AUTOMATIC SCALING

The basic arithmetic operation given by Eq. 19 implies a doubling in the potential range of complex number magnitudes at each iteration. If the arithmetic unit employed fixed point arithmetic and were equipped for scaling, then $m$ iterations starting with $n$-bit quantized samples would require $n+m$ bit accuracy both in the arithmetic unit and memory representation. For applications in which $m$ is in the same range or greater than $n$, unscaled fixed point arithmetic would result in an inefficient use of equipment.

Alternatively, maintaining a constant bound by halving results at each iteration (where halving by definition includes loss of the low order bit) without regard for the data could lead to unnecessary loss of accuracy, and in some examples might yield meaningless results. To illustrate, consider processing a record with only one nonzero sample. The indexing pattern is such that one of the operands in Eq. 19 would always be zero in this case, so if the number of iterations exceeds the number of binary digits in the original sample, all results would be zero. Approximations to this example would be encountered in practice due to abrutp changes in signal level.

The scaling procedure adopted in the present invention is one using a common scale factor for the entire array, rescaling the array only when necessary. In this way a maximum of precision is retained without the expense and time consumption of floating point arithmetic. If for any iteration, an arithmetic result may tend to overflow, then *all* results formed during that iteration are right-shifted, rounded, and truncated. A count of the number of iterations in which scaling was required thus determines the scale factor. If this count is denoted EX, then the final array, $A_m$, has the interpretation:

$$\frac{2^{EX}}{N}A_m=2^{EX-m}A_m \qquad (22)$$

where N is the array size.

Using a common scale for the entire array, rather than normalizing numbers individually, makes it meaningful to retain more digit positions in computation than are valid in the original sample values or in the trigonometric coefficients. The number of such digits of extended precision determine the extent to which large isolated elements may accumulate in the array (which force rescaling) without forcing total loss of the accuracy in remaining elements.

With the use of a common scale factor, the decision as to whether to rescale the array or not is best made at the start of each iteration based on observation of the results of the preceding iteration. Changing scale at any other time would reduce the efficiency in use of memory by the requirement for flag bits in array elements—in effect limited floating point exponents. If only partial rescaling were used, the indexing required to keep account of what parts of the array have been rescaled would soon prove quite burdensome and wasteful of memory.

The criterion chosen for deciding whether to rescale all results of an iteration by ½ or to leave the scale unchanged requires a determination of whether any result of the preceding iteration was outside a specified region in the complex plane. If this region is denoted by S and numbers in memory are interpreted as signed proper fractions, the necessary and sufficient condition for a point A to be contained in S is $$|A|<\tfrac{1}{2} \qquad (24)$$

This constraint is *sufficient* since if both operands in the summation involved in Eq. 19 are within the circle of radius ½, then the sum will not exceed 1 in magnitude. Both the real and the imaginary components will therefore be less than 1 in absolute value.

The above constraint may be proved *necessary* by use of contradiction. Assume S includes complex numbers with magnitude exceeding ½, and let Z denote the maximum number on the real axis inside S. Then during some iteration which does not involve rescaling, a set of results may occur with magnitude exceeding 1 (say $1+\epsilon$) because the operands of Eq. 19 exceeded ½. Then on each subsequent iteration, pairs of these complex numbers may combine to yield magnitudes of $2+2\epsilon$, which are rescaled again to $1+\epsilon$. However, in each such iteration, one of the $1+\epsilon$ numbers may be rotated into the real axis by the $\exp(j\theta)$ coefficient in Eq 19. Thus, after one iteration, the maximum real component increases from the postulated Z to $$\tfrac{1}{2}(Z+1+\epsilon)$$

and after $n$ such iterations, the maximum real component is:

$$\left(\frac{1}{2}\right)^n Z+\sum_{k=1}^{n}\left(\frac{1}{2}\right)^k(1+\epsilon)$$

The proof is completed by noting that for $n$ sufficiently large this summation exceeds 1 since $$\lim_{n}\sum_{k=1}^{n}\left(\frac{1}{2}\right)^k=1$$

One feature of the present invention therefore relates to the testing of the results of an iteration to see if relation 24 is satisfied. It proves convenient in one embodiment of the present invention to refer each computational result not to a circle of radius ½ as implied by relation 24 but rather to an approximation in the form of an irregular "staircase" region like that partially shown in FIG. 4. Since the boundary is symmetrical in each quadrant, the approximation may be described in terms of the vertices in the first quadrant of the complex plane, viz., $$(\tfrac{1}{8}+j\tfrac{15}{32}),\ (\tfrac{1}{4}+j\tfrac{13}{32}),\ (\tfrac{5}{16}+j\tfrac{3}{8}),\ (\tfrac{3}{8}+j\tfrac{5}{16}),\ (\tfrac{13}{32}+j\tfrac{1}{4})$$

and $(\tfrac{15}{32}+j\tfrac{1}{8})$

If $A=a_0a_1a_2 \ldots a_5$ denotes the binary 2's complement representation of a real or imaginary part of a number and $v$ indicates logical union, the Boolean expressions which need to be tested to determine whether or not A lies within the prescribed boundaries are:

$$(|A|<\tfrac{15}{32})=\bar{a}_0\bar{a}_1[\bar{a}_2v\bar{a}_3v\bar{a}_4v\bar{a}_5]va_0a_1[a_2va_3a_4va_5] \qquad (25a)$$

$$(|A|<\tfrac{13}{32})=\bar{a}_0\bar{a}_1[\bar{a}_2v\bar{a}_3v\bar{a}_4\bar{a}_5]va_0a_1[a_2va_3va_4a_5] \qquad (25b)$$

$$(|A|<\tfrac{3}{8})=\bar{a}_0\bar{a}_1(\bar{a}_2v\bar{a}_3v\bar{a}_0\bar{a}_1(a_2va_3)) \qquad (25c)$$

$$(|A|<\tfrac{5}{16})=\bar{a}_0\bar{a}_1(\bar{a}_2v\bar{a}_3\bar{a}_4)va_0a_1(a_2va_3a_4) \qquad (25d)$$

$$(|A|<\tfrac{1}{4})=\bar{a}_0\bar{a}_1\bar{a}_2va_0a_1a_2 \qquad (25e)$$

$$(|A|<\tfrac{1}{8})=a_0a_1a_2a_3va_0a_1a_2a_3 \qquad (25f)$$

Figure 4:
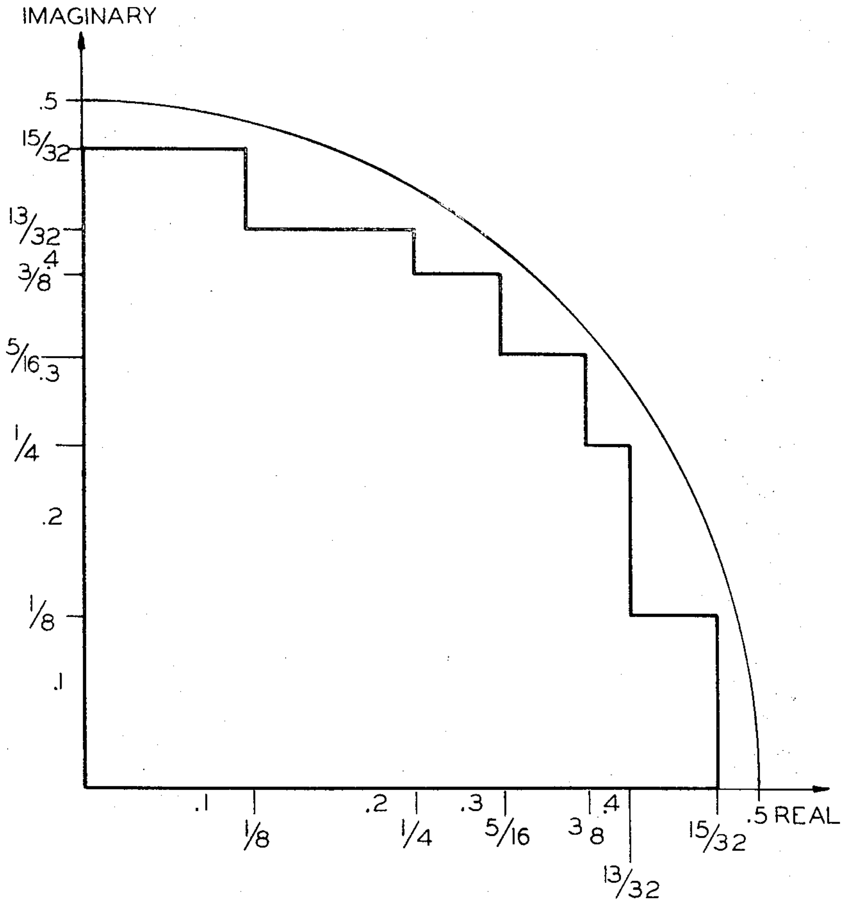
FIG. 4 shows a typical region of the complex plane within which the value of a result of an iteration must fall if no scale change is to be effected.

The six signals of the above form from each of the real and imaginary parts are combined pairwise to determine whether a complex result is within the boundary defined by FIG. 4.

Standard logic networks are used to implement Eqs. 25*a–f* and the network for combining results of tests for real and imaginary values. More will be said below regarding the manner in which the scaling operations fit into the overall computational pattern.

COMPLEX ARITHMETIC UNIT-SEQUENCE OF OPERATIONS

The steps performed by the arithmetic unit shown in FIG. 3*a* in executing the arithmetic operations implied by Eqs. 20, 21*a* and 21*b* are the following:

(1) $AR_i(K)$ and $AI_i(K)$ are presented on leads 308 and 309 in FIG. 3*a*. When separate arithmetic loops are used for $AR_{i+1}(J)$ and $AI_{i+1}(J)$ these multiplicands are presented to each loop, although, as mentioned above, the adders to which they are supplied are opposite for the two loops. It is convenient in some applications to provide buffering between memory and the adders but this is not essential to the invention.

(2) A memory cycle is commenced to gain access to $A_i(J)$. Of course this could be accomplished in some cases at the same time that $A_i(K)$ is accessed, but since it is not needed at that time, temporary storage for $A_i(J)$ would have to be provided.

(3) The recoded sin $\theta$ and cos $\theta$ multiplier functions are presented over leads 310 and 311. The well-known iterative steps of adding and shifting to form $A_i(K)\exp(j\theta)$ are then performed. For this purpose, selectors 306 and 307 form appropriate multiples of their respective components of $A_i(K)$. For instance if the carry-save adders are used to perform base 4 multiplication, the selectors, according to an advantageous technique described below under "Multiplier Recoding," form the 0, +1, −1 or +2 multiple of the complex component $AR_i(K)$ or $AI_i(K)$ depending on the recoded trigonometric multiplier value.

(4) $AR_i(J)$ and $AI_i(J)$ are gated into the respective real and imaginary input selectors 306 just as the final partial sum of the multiplications is gated into the accumulators.

(5) Selectors 306 form the +1 multiples of $AR_i(J)$ and $AI_i(J)$ and the results are passed to the accumulator. This result in stored-carry form is then assimilated by selecting the means of selector 306 output of the carry generator 304 as the input to the upper pair of adders 301. The carry generator 304 forms a word of digits which are zero if the corresponding digit in the stored-carry form of the number will be unchanged by propagating carries. A carry generator digit is one if the corresponding stored-carry form is to be augmented. Adding this word digitwise while discarding base 4 carries formed in the addition yields the result in canonical form. A similar procedure will, of course, follow when other than base 4 arithmetic is used.

(6) The assimilated result of step 5, $A_{i+1}(J)$, is gated to the output. Simultaneously it is negated by the selector 305 at the accumulator input and gated into that register also.

(7) $A_{i+1}(K)$ is then realized according to Eq. 20 by selecting the +2 multiples of $AR_i(J)$ and $AI_i(J)$ as the inputs to the upper adders 301. This result is assimilated as in step 5, and gated to the output as soon as storage of the first result, $A_{i+1}(J)$, has been completed.

It should be noted that some further improvements in efficiency can be achieved by substituting an addition in place of a multiplication at certain times. This is possible when the trigonometric arguments are integer multiples of $\pi/2$, yielding function values of 0, +1, or −1.

COMPLEX ARITHMETIC UNIT—MULTIPLIER RECODING

A technique known as multiplier recoding is employed in one embodiment of the present invention. A more complete discussion of the theory of recoding can be found in a paper by J. O. Penhollow entitled "A Study of Arithmetic Recoding with Applications in Multiplication and Division," Report 128, University of Illinois, Digital Computer Laboratory.

The multiplier recoding used in this embodiment is of a base 4, left-directed, nonredundant form. The purpose of the recoding is to facilitate reducing the number of adder uses in multiplication to half the number of binary digits in the multiplier, hence the pairing as base 4 digits. The effect of the recoding is to re-express base 4 numbers (digits of which conventionally assume the values 0, 1, 2, or 3) by excluding the value 3. Instead of a 3, the values −1 or −2 are used. The reason for excluding 3 is that circuit complexity and execution time required to form −1 or −2 times a multiplicand in a binary machine are substantially reduced compared with those needed to form the +3 multiple. The recoding is nonredundant i.e., the number of possible digit values in the recoded number is equal to the radix, because multiplier digits are treated serially in the processor. Thus no time advantage results by admitting more than 4 possible digit values.

Assume the multiplier, X, is given in radix complement form in binary, i.e.;

$$X=-2x_{-1}+\sum_{i=0}^{2k} x_i 2^{-i}$$

so that bits may be paired to form base 4 digits, $y_i$, as follows:

$$X=x_{-1}x_0 . x_1x_2x_3x_4 \ldots x_{2k-1}x_{2k}$$
$$=y_0 . y_1y_2 \ldots y_k$$
$$=\sum_{i=0}^{k} y_i 4^{-i}$$

For $i>0$, $y_i$ may be 0, 1, 2, or 3; since the multiplier will be a sine or cosine, $y_0$ may assume values of +1, 0, or −1, (i.e., the fourth value which $x_{-1}x_0$ may represent, −2, need not be provided for). Let $m_i$ denote a Boolean variable associated with each $y_i$, and defined by $$m_i=x_{2i-1}x_{2i} v x_{2i-1}m_{i+1} \quad (26)$$

where $v$ indicates logical union. Then if $yi'$ denotes the $i$th digit of the recoded multiplier, the recoding is given by $$y_i'=y_i+m_{i+1}-4m_i \quad (27)$$

Figure 5:
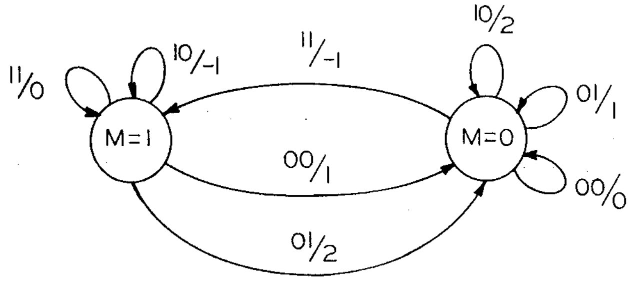
FIG. 5 shows a state diagram that is helpful in understanding a multiplier recorder employed in some embodiments of the present invention.

The sequential nature of the recoding is apparent from the recursive form of Eq. 26 and is illustrated in the state diagram in FIG. 5. In the state diagram of FIG. 5, transitions labeled IJ/K indicate that recoded digit K is produced in response to binary digit pair IJ for the indicated state M. The embodiment of $m_i$ according to one embodiment of the present invention is a flip-flop M which modifies the interpretation of base 4 multiplier digits. Using +2, +1, 0, and −1 as the allowed digit values, the Boolean expressions which define the recoder are $$+2: x_{2i-1}\bar{x}_{2i}\bar{M} v \bar{x}_{2i-1}x_{2i}M$$
$$+1: \bar{x}_{2i-1}x_{2i}\bar{M} v \bar{x}_{2i-1}\bar{x}_{2i}M$$
$$0: \bar{x}_{2i-1}\bar{x}_{2i}\bar{M} v x_{2i-1}x_{2i}M$$
$$-1: x_{2i-1}x_{2i}\bar{M} v x_{2i-1}\bar{x}_{2i}M \quad (28)$$

The recoder also generates the next value for M using Eq. 26.

When binary digits $x_{2i-1}x_{2i}$ are considered to form one base-4 digit, and both have value 1, the recoding has the effect of giving negative weight to $x_{2i-1}$, then correcting this by adding 1 to the next digit on the left. Therefore, no special provision is required for the negatively weighted sign bit, i.e., by "neglecting" the corrective step just described, the same recoding logic can be used on $y_0$ as the other base 4 digits.

It may be noted that the multiplicand multiples for the lower adder on the real accumulator in FIG. 3*a* are −2, −1, 0 and +1. Thus digit values generated as sin $\theta$ as recoded according to Equation 28 may be interpreted negatively to reflect the negation of the second product in Equation 21*a*.

A by-product of the recoding is a simplication in negating the multiplier. Thus, to form a cosine from a sine table using the identity $$\cos\left(\theta+\frac{\pi}{2}\right)=-\sin\theta$$

the two's complement negation may be formed by a bitwise negation of sin $\theta$, together with a setting of the flip-flop M to 1 as the initial state for multiplications.

COMPLEX ARITHMETIC UNIT—TYPICAL DIGIT POSITION

Two binary digit positions of the real part of the arithmetic loop of FIG. 3*a* according to one embodiment of the present invention are shown in FIG. 6. These digit positions are identical to digit positions in the imaginary part. The digit positions are "typical" in contrast to the low order positions (where special provisions are required due to the complement carry, round-off, etc.,) and the high order positions (where sign propagation and intermediate overflow must be dealt with). The high order and low order positions according to one embodiment of the invention will each be treated in turn below. Even and odd numbered bit positions differ from each other only because of the fact that the carry generator operates in base 4. One of these differences, as can be seen in FIG. 6, is the need for a fourth option at the input of the upper adder in odd-numbered positions. Another difference is the requirement to suppress a carry signal from even-numbered locations during assimilation. The notation used in FIG. 6 includes terms beginning with IB; this indicates input buffer or where none is used, simply input from memory. Subscripts denote the weight of each bit, where subscript $k$ indicates a weight of $2^{-k}$. An overscore indicates logical negation. The letter R at the end of signal names indicates real part; the corresponding imaginary arithmetic loop would include signals identified, for example, by $IBI_{2i}$ for input (buffer) imaginary and weight $2^{-2i}$. CG signals are those from the carry generator bits identified by the subscripts. The UCR signals are generated in the added circuits, see FIGS. 7*a*, *b*. Optional output buffer stages 610 are shown with associated gates. The RESCALE leads are advantageously introduced between the output of the arithmetic unit proper and the suggested output buffer to effect a scale change when required.

The flip-flops 601 and 602 used to realize accumulator bits ASR and ACR, (referring respectively to accumulator, sum bit, real and accumulator, stored carry, real), are each of the J–K type to provide the effect of double rank storage. They are the only memory elements within the arithmetic loop. The upper and lower adders, 603 and 604 labeled type 1 and type 2 respectively in FIG. 6, differ because the AND and EXCLUSIVE OR of each pair of sum and carry bits are useful to the carry generator, hence these signals are generated as intermediate results as part of adder type 1. These connections to the carry generator from upper adders are omitted in FIG. 6. Fewer nodes of propagation delay are required if the sum and carry are formed directly, as may be observed by comparing the two adder types in FIGS. 7*a*, *b*. FIG. 7*a* shows a type 1 adder and FIG. 7*b* shows a type 2 adder. In both circuits, the logical elements are NAND circuits. Although not always required, provision to suppress carries is included in all type 1 adders.

It should be noted in FIG. 6 that the multiple of the imaginary portion of the operand available as inputs to the lower adder are −2, −1, +1, and by default zero, reflecting the minus sign in Eq. 21*a*. The same control signals used to effect these selections are used in the imaginary portion of the arithmetic loop to select respectively the +2, +1, and −1 multiples of the real portion of the operand during multiplication.

COMPLEX ARITHMETIC UNIT—MOST SIGNIFICANT DIGIT POSITIONS

The nonrepetitive equipment necessary at the left end of the arithmetic loops is dependent on the range of numbers which must be represented. The scaling constraints, the multiplier recoding, the stored carry form of arithmetic, and the constraints resulting from the fact that the two multipliers are sine and cosine of the same angle al go toward determining this range of numbers.

First, consider the range of numbers in the accumulators. Since all results of any iteration must satisfy $|A|<1/2$ to prevent a rescaling by ½ during the next iteration, it follows that no results of the operation described in Eq. 19 will exceed 1 in magnitude (provided the initial data satisfy this bound), or equivalently, no operands in the recursions exceed 1 in magnitude. Denoting the real and imaginary as AR and AI, respectivly, then the above bound on the magnitude of A implies $$MAX|\pm AR\pm AI|<\sqrt{2} \quad (29)$$

for any combination of signs. The steps in multiplication for the real component, as an example, may be described by $$P_{k+1}=1/4\,(p_k+yc_{n-k}\cdot AR-ys_{n-k}AI) \quad (30)$$

where $p_k$=$k$th partial product sum, $k=0, 1 \ldots n$ $p_0=0$ the final product sum is $4p_n$, and $yc_{n-k}(ys_{n-k})$ is the recoded base 4 digit of weight $4^{n-k}$ in the cosine. $Ys_{n-k}$ is the recoded base 4 digit of weight $4^{n-k}$ in the sine, $n$ is the number of base 4 digits to the right of the radix point.

Therefore, since the maximum absolute value of a digit in the recoded multipliers is 2, Eqs. 29 and 30 indicate that the maximum by which a partial product sum may be augmented during any intermediate step in multiplication is $1/4(2\sqrt{2})$. Since digits for both multipliers may assume the value 2 repeatedly during intermediate steps, the limiting partial product sum to be represented in the accumulator may be evaluated as the sum of a geometric series given by $$\frac{(1/2)\sqrt{2}}{1\text{-}1/4}=\frac{2\sqrt{2}}{3}\doteq .945<1 \quad (31)$$

The bound on the absolute value of either part of the final complex product is also 1, despite the fact that the coefficient of ¼ in Eq. 30 does not apply to the last step. This is because the complex multiplier, $\exp(j\theta)$, is bounded by 1 in magnitude. Since the components of $A_i(J)$ in Eq. 20 are similarly bounded by 1, the parts of $$A_i(J)+A_i(k)\ \exp(j\theta)$$

are bounded by 2 in absolute values. This limit is in fact a necessity since rescaling by ½ must reduce results to a range representable in memory. The boundary value must itself be excluded from the possible range of numbers, since both +1 and −1 cannot be represented in memory. The exclusion is achieved by defining the region in FIG. 4 to include only numbers with magnitude *less* than ½. The range of absolute values held in the accumulators is thus less than 2, and therefore a four's complement representation is sufficient. If $AS_i$ and $AC_i$ denote the $i$th accumulator sum and stored carry bits, respectively, the numerical interpretation is $$-2AS_{-1}+\sum_{i=0}^{11}(AS_i+AC_i)2^{-i} \quad (32)$$

Next, the bound on the output of the first, or upper, carry-save adder exceeds 2 but not 4 in absolute value. To show this intermediate sum may be greater than 2, assume either component of an operand is $1-\epsilon$ and a multiplier digit of 2 occurs. Then if the preceding partial product sum exceeded $2\epsilon$, the output of the first adder exceeds 2. If the upper sum exceeded 4 during multiplication, the partial product sum could exceed 4, resulting in a value of $p_k>1$, contrary to what was established earlier. (During the other arithmetic operations, this value may not exceed 2.) Therefore, an eight's complement representation is used to represent the upper sum. If $US_i$ and $UC_i$ denote sum and carry bits, respectively, the numerical interpretation is $$-4US_{-2}+\sum_{-1}^{11}(US_i+UC_i)2^{-i} \quad (33)$$

Finally, the low adder output must also be less than 4 during multiplication since $|p_i|<1$. However, there are fewer deviations from typical digit position logic if a 16's complement representation is used. If $S_i$ and $C_i$ are sum and carry outputs, respectively, the interpretation in $$-8S_{-3}+\sum_{-2}^{+11}(S_i+C_i).2^{-i} \quad (34)$$

The Output Buffer requires only a two's complement representation.

COMPLEX ARITHMETIC UNIT—LEAST SIGNIFICANT DIGIT POSITIONS AND ROUND-OFF RULES

Multiplication introduces two complications to the low order digit positions. Round-off also requires non-standard circuitry. First consider multiplication.

Digits of the carry-save partial product which are right-shifted past the low order digit position cannot be neglected (as would be possible if carry-propagating adders were used, or if the shift distance were only one digit) since assimilating these digits could affect the low order digit as to the accuracy retained. Specifically, when right-shifting the second adder output $$\begin{array}{l} \ldots C_9C_{10}0 \\ \ldots S_9S_{10}S_{11} \end{array}$$

by two digit positions, the effect of $C_{10}=S_{10}=1$ must be considered, even though these digits individually are to be discarded.

Recoding the multiplier required the use of negative digit values, which implies the need for a complement carry in the low order position of the mulitiplicand multiple. However, the carry input to the low order digit adder, which is conventionally available for this application, is also required by the shifted stored carry.

The problem may be illustrated by enumerating the digits to be added in each position during an intermediate step in multiplication:

| | |
|---|---|
| $\ldots AC_{10}\ AC_{11}$ | accumulator |
| $\ldots AS_{10}\ AS_{11}$ | contents |
| $\ldots D_{10}\ D_{11}$ | multiplicand multiple |
| $D_{11}^*$ | to upper adder |
| $\ldots E_{10}\ E_{11}$ | multiplicand multiple |
| $E_{11}^*$ | to lower adder |
| $K_{11}$ | due to $S_{10}=C_{10}=1$ on previous step |

where asterisked (*) bits are complement carrys. In all but the last position there are four bits to add. Three may be used as input to the upper adder, and the fourth together with the sum and carry output of the upper adder are inputs to the lower. In the last position, there is a capacity to add as many as five bits, since the upper adder has no carry output to the low order position of the lower added. However, as indicated above, there is a need to consider *seven* bits in the low order position.

The solution adopted is to define an extra bit at the right end of each accumulator to record the existence of a deficiency in the accumulated partial product at each step. To avoid slowing the entire arithmetic loop, four added flip-flops are provided to record the information to determine the next state of this bit, denoted DFR (DFI) for the real (imaginary) arithmetic loops. During each step involving a right shift by two bits, the lower adder outputs $S_{10}$, $S_{11}$, and $C_{10}$, together with one of the other summand digits of least significant position for which no input was available (say $D_{11}^*$), are recorded in flip-flops. Then, in parallel with the step $i+1$, the addition indicated below is performed:

$$\left.\begin{array}{r} S_{10}S_{11} \\ C_{10}D_{11}^* \\ \underline{DF_i} \end{array}\right\} \begin{array}{l}\text{digits formed}\\ \text{during step } i\end{array} \qquad (35)$$
$$DF_{i+1}$$

The pertinent result of this addition is the high order carry, represented by $DF_{i+1}$, which has the same weight as the least significant digit in the accumulator. The two other bits of the above sum represent digits of the product which are not being retained (although one of these affects roundoff as described below).

On the last step in multiplication, which involves no shift, there is a possibility of $DF_{i+1}=1$ due to the digits of the preceding step; $D_{11}^*=1$ may also occur during this step, a circumstance for which no adder input is available. Thus the product as represented in the accumulator through digit position 11, may be deficient by as much as 2. Treatment of this deficiency will be described as part of the discussion of implementing roundoff.

The procedure adopted for *round-off* of results is as follows:

(a) If arithmetic results of the current iteration are not being rescaled, only the product is rounded (since it is the only occasion for truncation). The rule is to add 1 in the least significant digit position of the product if the truncated portion equals or exceeds ½ with respect to this digit. The required information is provided by retaining the sum bit next in significance to $DF_{i+1}$ in the operation indicated in 35 during the last step in multiplication. The bias error due to always rounding when the truncation is exactly ½ is considered negligible.

(b) If arithmetic results are being rescaled then the above rounding is suppressed. The only number to be rounded is $A_{i+1}(J)$ as defined in Eq. 19. Round-off consists of adding 1 to the least significant digit being retained after rescaling, based on whether or not the truncated portion equals or exceeds ½. Round-off of $A_{i+1}(K)$ separately is not required since the quantity $2A_i(J)$ in Eq. 20 does not affect the low order digit position.

When rescaling does not apply, a number as large as 3 (regarding the low order digit as unity) may be required to augment the product after the last iterative step in multiplication; the deficiency described above may be as large as 2, and a round-off may be needed. This correction is possible during the addition which follows the multiplication because accumulator bit $AC_{11}=0$ following multiplication, hence that adder input is available, and two of the three inputs to the least significant stage of the lower adder are available since the lower adder is not otherwise functional during this addition.

The rounding when rescaling applies may be achieved by forcing $AC_{11}$ to appear as 1 to carry generator following the addition which completes $A_{i+1}(J)$. (Again, this bit would otherwise be 0.) This effects the addition of 1 to the low order digit of the accumulator, such that a carry propagation to the next stage (position No. 10) performs the rounding conditional on the low order bit. Any deficiency in the product is corrected during the addition in the same manner indicated above for the nonrescaled case.

COMPLEX ARITHMETIC UNIT—CARRY GENERATOR

As described earlier, the carry generator is used for the purpose of converting a number in stored carry form to canonical form. The conversion is achieved by using the local carry propagation property of the carry-save adder network itself. Regarding pairs of binary digits in the accumulator as single base 4 digits, the Carry Generator forms a word of bits, one for each quaternary accumulator digit, to be added modulo 4 in each position.

Denote the AND and EXCLUSIVE OR between $AC_i$ and $AS_i$ as $G_i$ and $P_i$, respectively, mnemonically indicating the carry-generate and carry-propagate conditions. The carry generator output for bit position *k*, *k* odd, is then $$C.G._k=G_{k+1}vP_{k+1}G_{k+2}vP_{k+1}P_{k+2}G_{k+3}v \ldots vP_{k+1}P_{k+2} \ldots P_{10}G_{11} \qquad (36)$$

The carry output of the upper adder in even numbered bit positions, i.e., in the more significant of the bits paired as base 4 digits, is suppressed during assimilation (as illustrated in FIG. 6) since the digitwise addition is modulo 4. If this were not done, the $G_{k+1}$ term in Equation 36 would have a two-fold effect on digit position *k*, once through the adder network and once by way of the $C.G._k$ term. If, alternatively, $G_{k+1}$ were omitted from 36, then a deficiency in digit *k*—1 would exist because the carry-save adder network of FIG. 6 does not provide a path for $G_{k+1}$ to affect digit $k-1$ (or $G_{2i+2}$ to affect digit $2i$ in terms of the indexes used in the diagram).

SPEED OF OPERATION

The time consumed in executing the CT algorithm is dominated by the complex arithmetic and operand referencing. The effect of time consumed in forming the trigonometric coefficients, whether by table look-up or by logic circuitry, is attenuated by the fact that these coefficients change only $2^i$ times during the $i$th operation, $i=0, 1 \ldots m-1$, as illustrated by Eq. 18. The ratio of changes in coefficients to memory operand references (reads and writes) is $$\frac{\sum_{0}^{m-1} 2^i}{2N \log_2 N} \doteq \frac{1}{2 \log_2 N} \tag{37}$$

Thus for N in the range of $2^9$ to $2^{13}$, the additive effect of referencing memory for trigonometric coefficients is 4 percent to 6 percent, even if no concurrency is assumed in the operation of the processor with memory.

INDEXING LOGIC—GENERAL CONSIDERATIONS

In addition to the complex arithmetic unit, FIG. 2 shows one embodiment of the present invention to include:

(a) An indexing circuit for providing a self-consistent sequence of operands and trigonometric function values at the complex arithmetic unit, (b) An input buffer for transferring new data into memory for processing, and (c) An output buffer for transferring completed results to a programmed computer or other storage or processing equipment on request, reordering the CT algorithm results into conventional sequence as part of the transfer.

Flexibility is provided in (a) format of data during transfer to the FFTP memory, (b) the size of the array, (c) the selection of results to be transferred from the FFTP to the computer, (d) the sign of the exponent of the kernal, (i.e., to approximate the Fourier transform or inverse), and (e) the numerical accuracy of the trigonometric coefficients.

INDEXING LOGIC—SEQUENCING OPERAND ADDRESSES

Let the following definitions apply as before:

(a) $N=2^m$ is the size of the array being processed, where $m$ is an integer (b) $m=\log_2 N$, and (c) $i$ is the iteration index in the algorithm, $i=0, 1 \ldots m-1$.

The pairs of entries required as operands during the $i$th iteration are given by the indices of Eq. 18. If the complex array entries, numbered $0, 1 \ldots N-1$, are stored in memory at the same-numbered addresses, the required address pattern may be described as partitioning the ordered array into $2^{i+1}$ equal segments, then selecting as operand pairs the corresponding elements in adjacent segments. In the index used in Eq. 18, the binary field $k_{m-1} \ldots k_{m-i-1}$ identifies these segments, while the field $k_{m-i-2} \ldots k_0$ indicates the position of the element to be operated on within the segment.

The generation of this address pattern in the FFTP is achieved in one embodiment of the present invention by the Iteration Shift Register 201 together with the binary address counter 202 shown in FIG. 8. Denote the contents of these two registers as:

$$\ldots ISR_{12}, ISR_{11} \ldots ISR_0$$

and $$\ldots AC_{12}, AC_{11} \ldots AC_0$$

respectively. The bits of AC correspond to the digits of K in Equation 18. The current value of $i$, the iteration number index is coded in $$ISR_{m-i-1}=1$$
$$ISR_j=0, \text{ for } j \neq m-i-1$$

To form the addresses in the order required for the operations described above under Complex Arithmetic Unit—Sequence of Operations, the following steps are performed in sequence.

(a) $ISR_j v AC_j \rightarrow AC_j$, all $j$.
(b) Read memory. This accesses $A_i(K)$.
(c) $\overline{ISR}_j \cdot AC_j \rightarrow AC_j$, all $j$.
(d) Read memory. This accesses $A_i(J)$.
(e) Store first result, $A_{i+1}(J)$.
(f) $ISR_j v AC_j \rightarrow AC_j$, all $j$.
(g) Store second result, $A_{i+1}(K)$.
(h) Add 1 to AC, and repeat the above operations.

At each memory access, the address used is that indicated by AC. When step $h$ above leads to a high order carry-out of address counter 202, indicating the end of an iteration, the contents ISR of iteration shift register 202 are right shifted one bit position. No deviation from the above sequence, or control loop, is required at the end of intermediate iterations, because the carry-out also indicates the remaining bits in the address are zero. The control loop is terminated after the final iteration when the right shift of the iteration shift register 201 is attempted with $ISR_0=1$.

SEQUENCE OF TRIGONOMETRIC COEFFICIENTS

Since the index digits which define $\theta$ values in Eq. 18 are only those to the left of $k_{m-i-1}$, the ISR register 201 and AC register 202 are also useful in sequencing the trigonometric coefficients. While the address counter 202 itself holds the desired index field, practical use of this register is complicated by the variable position and size of the field that are otherwise desirable. The index field $k_{m-1} \ldots k_{m-i}$ is therefore duplicated in a separate counter, labeled the Theta Counter 204 in FIG. 8. Just as in the address counter register, the condition for incrementing this field is a carry through $k_{m-i-1}$ (i.e., $AC_{m-i-1}$). Therefore, the increment $\theta$ logic block 203 in FIG. 8 may be described by the following Boolean function $$\bigvee_{j=0}^{12} ISR_j \cdot c_j$$

where V denotes logical OR, and $c_j$ is the carry into bit $j$ of the address counter or, equivalently, the 1-to-0 transition of $AC_{j-1}$. The bits of the theta counter are denoted as, $$\ldots T_{12}, T_{11} \ldots T_0$$

and the correct value of $\theta$ is represented if bit $T_j$, conventionally interpreted as the $2^j$-weight digit of the counter, is assigned the weight $\pi \cdot 2^{-j-1}$. The sequence of $\theta$ values that results is shown in FIG. 9.

One method for obtaining the trigonometric function values from the arguments is a straightforward logic network. Another method is to use the contents of the theta counter 204 to address a table in memory. The mode is selected by one bit of a control word discussed below.

The actual trigonometric function values to be used as multipliers can easily be generated in the correct sequence once the sequence of arguments is available. A typical sine translator 210 is shown in FIG. 8 which accepts input values from the theta counter 204 and delivers sine function values to the arithmetic unit 50 in FIG. 2 or, when recoding is desired, to the recoder 322 in FIG. 3*b*. Of course a similar translation can be provided for cosine function values or the cosine values may themselves be derived from the sine values.

An alternate method for providing the necessary trigonometric values requires storing them with the results of the iteration. These trigonometric values can then be recalled in response to their respective arguments generated by the theta counter. FIG. 8 shows a memory address selector which is capable of directing the retrieval of iteration results or trigonometric values in response to signals from the address counter 202 or the theta counter 204 respectively.

OPTIONS AVAILABLE

Much of the flexibility inherent in the present invention is provided in the indexing circuit of FIG. 8. A control register 220 in FIG. 8 is supplied with information regarding the nature of the transform to be performed, i.e., the frequency transform or time transform, the record length, etc. For these purposes the control register 220 is divided into several fields.

The RECORD LENGTH FIELD (RLF) of the control register indicates the size of the record to be processed. The size of the array may, for example, be chosen to be any of $2^{13-n}$ values, with $n=0, 1 \ldots 5$, or 6. For hardware simplicity, RLF is redundantly expressed using 6 bits, so that a record length of $2^{13-n}$ is indicated if the leftmost $n$ bits of RLF are 1. The following table illustrates the coding

| RLF: | Record length |
|---|---|
| 000000 | $2^{13}$ |
| 100000 | $2^{12}$ |
| 110000 | $2^{11}$ |
| ⋮ | ⋮ |
| 111111 | $2^{7}$ |

RLF is used (a) to gate the proper bit of the iteration shift register 201 in FIG. 8 to 1 as the processing of a record is started, (b) to cause the address counter to count modulo $2^{13-n}$ during the FFT, (c) to modify AC when loading new data, and (d) to modify operation of the theta counter when it is used to reference memory either during table look-up or the transfer of results from the FFTP.

Denote the bits of RLF as $RL_{12}$, $RL_{11} \ldots RL_7$. As an initial step in the FFT process, the ISR register is set as follows:

$$ISR_{12}=RL_{12}$$
$$ISR_i=RL_{i+1}\cdot\overline{RL_i},\ i=7, 8 \ldots 11 \quad (40)$$
$$ISR_i=0,\ i<7$$

Thus, $ISR_j$ is set to 1 for an array in which the binary CT algorithm requires $j+1$ iterations.

RLF modifies the operation of the address counter described above by holding any unused bits at the left end of the address counter to 1 if the size of the array is less than $2^{13}$ for the present illustration. This results in a carry out of digit $AC_{12}$ at the end of each FFT iteration regardless of array size. Specifically, step (a) of the basic indexing described above is expanded to include $$RL_j v AC_j \rightarrow AC_j,\ j=7, 8 \ldots 12 \quad (41)$$

This operation actually alters the AC contents only at the start of each iteration, but is included in the control loop for the generation of every result pair for simplicity. An incidental consequence of the OR'ing in relation 41 is that when the array size is $2^k$, $k<13$, the FFTP memory locations occupied by the array are $2^{12}(1-2^k)$ through $2^{13}-1$ rather than 0 through $2^k-1$.

Next, the control register 220 includes the TABLE/DECODE (TD) bit which allows indicating that a table of trigonometric coefficients is to be used, provided less than a maximum array is being processed. This option provides a means of studying the effects of reduced precision, as well as selecting optimum coefficient values. If $TD=1$, the theta counter 204 is used as an address to reference memory for the sine and cosine, rather than being translated by the translator 210, for example. The bits of the theta counter are connected to the memory address bus in reverse order, i.e., $T_0$ to address bit 12, $T_1$ to address bit 11,

⋮ and $T_{12}$ to address bit 0, the table is to be ordered with monotonically increasing argument values rather than being required to conform with the reversed index pattern.

When the theta counter is being used to reference memory, the RLF is used to modify the values it assumes. Specifically, the basic cycle of operation is:

(a) Increment the Theta Counter, (b) Read from memory the accessed word to the complex arithmetic unit, and (c) OR the RLF into the theta counter, i.e., $$RL_{12-j} v T_j \rightarrow T_j,\ j=0, 1 \ldots 5$$

This loop is interlocked with other operations in that step (a) occurs when the stimulus to increment $\theta$ is generated (see FIG. 8), which indicates a new pair of coefficients is required.

The address values formed by the above operations are such that the table is to be stored in locations 0 through $2^{m-1}-1$ for an array size of $2^m$. The argument applicable for the $j$th location is $j\cdot\pi\cdot 2^{-m+1}$.

When $TD=1$, the NI bit has no effect. Distinction between the Fourier transform and inverse is reflected in the sign of the sine values in the stored table.

Finally, the control word contains two bits designated F1 and F2 in FIG. 8 which allow specification of format for interpretation of data during transfer.

The present invention can, of course, perform spectral analyses of several distinct signals in real time. All that is required is that the time required by the FFTP to perform an analysis of a particular record be sufficiently shorter than the length of signal time represented by that record. For example, if each of two signals is divided into records T seconds long, a processing time not exceeding $T/2$ is needed if both are to be processed in real time.

The basic operation in the base 4 implementation of the FFT algorithm may be expressed in matrix form as:

$$\begin{bmatrix} A_{i+1}(K) \\ A_{i+1}(L) \\ A_{i+1}(M) \\ A_{i+1}(P) \end{bmatrix} = \begin{bmatrix} 1W & W^2 & W^3 \\ 1jW & -W^2 & -jW^3 \\ 1-W & W^2 & -W^3 \\ 1-jW & -W^2 & jW^3 \end{bmatrix} \begin{bmatrix} A_i(K) \\ A_i(L) \\ A_i(M) \\ A_i(P) \end{bmatrix}$$

where W is complex, and $j\equiv\sqrt{1}$. It happens that after the three complex products involved in forming $A_{i+1}(K)$ are completed, the remaining results may be formed without further explicit multiplications. This is so because any of the remaining products differ at most by a negation, and/or multiplication by $j$, from one of the three products involved in forming $A_{i+1}(K)$. Multiplication by $j$ requires only the interchange of real and imaginary parts of a complex number plus the negation of the real part.

An organization capable of operating alternatively according to the base 2 or base 4 form of the Cooley-Tukey algorithm is indicated in FIG. 10. The portion enclosed within the dashed lines 900 comprises substantially the same apparatus as used in the previously described base 2 embodiments. The three additional registers 901–903 provide storage for intermediate results needed in forming more than one sum.

The procedure for base 4 operation in the indicated organization is as follows:

(1) Access $A_i(P)$ from memory to register 910.

(2) From $A_i(P)\cdot W^3$, with the final product placed in register 903. (W, $W^2$, and $W^3$ are assumed to be available.) The complex multiplication procedure is the same as in the base 2 operation.

(3) Access $A_i(L)$ to register 910.

(4) Form $A_i(L)\cdot W$ in the accumulator.

(5) Form the sums $$A_i(L)\cdot W+A_i(P)W^3 \rightarrow \text{Register } \mathbf{901}$$
$$A_i(L)\cdot W-A_i(P)W^3 \rightarrow \text{Register } \mathbf{902}$$

(6) Access $A_i(M)$ and form $A_i(M)\cdot W^2$.

(7) $A_i(K)$ to register 910 and form the sums $$A_i(K)-A_i(M)W^2 \rightarrow \text{Register } \mathbf{903}$$
$$A_i(K)+A_i(M)W^2 \rightarrow \text{Register } \mathbf{910} \text{ and the accumulator}$$

(8) Then the final results may be formed as follows:

(a) $A_{i+1}(K)$=(contents of register 901)+(contents of register 903), with the result going to memory and the accumulator.

(b) $A_{i+1}(M)$=(accumulator contents)+2(contents of register 910). That is, $A_{i+1}(M)$ may be expressed as $$-A_{i+1}(K)+2(A_i(K)+A_i(M)W^2)$$

(c) Place contents of register 903 in the accumulator. $A_{i+1}(L)$=(contents of the accumulator)+$j$(contents of register 902), with result going to memory and the accumulator. Note that $j$ times the contents of register 902 is facilitated by reversing the connections of real and imaginary parts, as indicated in FIG. 10.

(d) $A_{i+1}(P)$=−(contents of accumulator)+2(contents of register 903).

Thus, due to symmetries in coefficients, the indicated basic step in base 4 organization is completed with three complex multiplications and eight additions, rather than the apparent twelve multiplications and twelve additions.

Although some of the above descriptions have indicated arrays having $2^{13}$ elements, no such array length is fundamental to the present invention, nor is it required that the number of elements be limited to an integer power of 2. The embodiments described are merely illustrative of the present invention. Although the description and drawings have indicated digital apparatus, corresponding analog circuits could easily be substituted in many instances.

Numerous variations within the spirit of the present invention will occur to those skilled in the art.

What is claimed is:

1. Data processing apparatus for obtaining complex Fourier series coefficients corresponding to at least one time-varying signal comprising (A) a memory unit having a plurality of locations, (B) means for entering sample values of each of said signals into said memory unit, (C) a trigonometric function generator, (D) arithmetic means for iteratively forming complex Fourier series corresponding to each of said time-varying signals, each series having terms based on values stored in said memory and on selected values supplied by said trigonometric function generator, (E) indexing means comprising means for selecting appropriate ones of said stored values and said trigonometric values for presentation to said arithmetic means.

2. The data processing apparatus of claim 1 wherein said memory comprises $2^m$ storage locations for each of said signals and said arithmetic unit forms $2^{m-i}$ Fourier series each having $2^i$ elements for each of said signals at the $i$th iteration, $m$ being an integer.

3. The data processing apparatus of claim 1 wherein said indexing means further comprises (A) a first counter for indicating the number of the iteration, (B) a second counter for indicating the step within an iteration, the state of said second counter being determinative of the memory location to be accessed at any given time, (C) means for altering the contents of said second counter in accordance with the contents of said first counter, (D) means for incrementing said second counter after a series of memory accesses are complete, (E) means for incrementing said first counter whenever said second counter exceeds a preselected count, and (F) means for generating a termination signal whenever said first counter reaches a preselected state.

4. The data processing apparatus of claim 3 further comprising means for altering said first and second counters in accordance with the number of sample values being processed.

5. The data processing apparatus of claim 3 further comprising a register for indicating the argument for said trigonometric generator, said register having contents given by $$\mathop{V}_{j=0}^{m} A_j\cdot B_j$$

where V denotes a logical OR, $A_j$ is the contents of said first counter and $B_j$ is the carry into bit $j$ of said second counter, the $j$th bit of said register being assigned the weight $\pi\cdot 2^{-j-1}$.

6. The data processing apparatus of claim 5 further comprising a translator for producing trigonometric function values in response to the contents of said register.

7. The data processing apparatus of claim 5 further comprising means for accessing trigonometric function values in locations specified by the contents of said register.

8. The data processing apparatus of claim 1 further comprising (A) a circuit providing an output signal whenever the magnitude of at least one result of a given iteration exceeds a preselected magnitude, (B) means responsive to said output signal for having all of the results of said given iteration, and (C) means for counting the number of times said halving occurs.

9. The data processing system of claim 1 wherein said trigonometric function generator comprises means for providing base-4 output digits assuming values selected from the group comprising 0, +1, −1, +2 and −2.

10. The data processing apparatus of claim 1 further comprising means responsive to said indexing means for selectively replacing the contents of said memory with the results of each iteration.

11. The data processing apparatus of claim 1 further comprising means responsive to said indexing means for terminating the iterative processing with the desired Fourier coefficient stored in memory.

12. Apparatus according to claim 1 further comprising means for extracting said Fourier series from said memory upon completion of said iterative processing.

13. A data processing system for generating complex Fourier series coefficients corresponding to at least one time-varying input signal comprising a memory unit, a trigonometric function generator, an indexing circuit, and an arithmetic unit for iteratively forming successive sequences of Fourier series coefficients based on values selected by said indexing circuit from said trigonometric function generator and on previously-generated Fourier coefficients selected by said indexing circuit from said memory unit.

14. A system according to claim 13 further comprising input-output means for facilitating the entry of samples of said time-varying signals into said memory unit and for facilitating the readout of said Fourier series coefficients from said memory unit upon the completion of said iterative processing.

15. An arithmetic loop for forming successive partial sums corresponding to one component of the product of a complex multiplicand and a complex multiplier comprising (A) an accumulator for storing partial sums,
(B) means for forming a first incomplete partial sum corresponding to one component of said multiplicand and one component of said multiplier,
(C) a first adder for forming a second incomplete partial sum by adding the prior content of said accumulator to said first incomplete partial sum, and
(D) a second adder for completing said second incomplete partial sum by adding to it a third incomplete partial sum corresponding to the other component of said multiplicand and the other component of said multiplier.

16. A digital arithmetic unit arranged to form the product of a complex-valued multiplicand and a complex multiplier and having at least one arithmetic loop, said loop comprising (A) a shift register for accumulating intermediate and final products,
(B) a first adder for producing a first sum,
(C) means for controllably gating the contents of said accumulator to said first adder, said contents thereby constituting an augend for said first adder,
(D) a first selector having inputs including one component of said multiplicand and one component of said multiplier, said first selector being arranged to form a sequence of selected multiples of said one component of said multiplicand under the control of successive digits of said multiplier, each of said multiples being controllably gated to said first adder as an addend,
(E) a second adder for producing a second sum,
(F) means for controllably gating said first sum to said second adder, said first sum thereby constituting an augend for said second adder,
(G) a second selector having inputs including the other component of said multiplicand and the other component of said multiplier, said second selector being arranged to form a sequence of selected multiples of said other component of said multiplicand under control of successive digits of said multiplier, each of said multiples being controllably gated to said second adder as an addend, and
(H) a third selector having inputs including said second sum and being capable of initiating shifts of the contents of said shift register.

17. A digital arithmetic unit according to claim 16 having a first arithmetic loop for forming the real component of said product and a second arithmetic loop for simultaneously forming the imaginary component of said product and wherein said one component of said multiplicand in said first loop is identical to said other multiplicand component in said second loop and said other component of said multiplicand in said second loop is identical to said one multiplicand in said first loop.

References Cited

UNITED STATES PATENTS

| | | | |
|---|---|---|---|
| 2,897,442 | 7/1959 | Wright et al. | 324—77 |
| 3,009,106 | 11/1961 | Haase | 324—77 |
| 3,180,445 | 4/1965 | Schwartz et al. | 181—.5 |
| 3,274,542 | 9/1966 | Ruehle | 340—15.5 |

OTHER REFERENCES

Cooley et al., Historical Notes on the Fast Fourier Transform, Proceedings of the IEEE, vol. 55, No. 10, October 1967, pp. 1675–77.

Klahn and Shively, FFT—Shortcut To Fourier Analysis, Electronics, Apr. 15, 1968, pp. 124–129.

Shively, A Digital Processor To Generate Spectra in Real Time, IEEE Transactions on Computers, vol. C–17, No. 5, May 1968, pp. 485–491.

MALCOLM A. MORRISON, Primary Examiner

C. E. ATKINSON, Assistant Examiner

U.S. Cl. X.R.

181—.5; 324—77; 340—15.5

PO-1050
(5/69)

UNITED STATES PATENT OFFICE
CERTIFICATE OF CORRECTION

Patent No. 3,517,173 Dated June 23, 1970

Inventor(s) Michael J. Gilmartin, Jr., and Richard R. Shively

It is certified that error appears in the above-identified patent and that said Letters Patent are hereby corrected as shown below:

Column 3, line 33, change "function" to --functions--; line 69, change "T/k" to --T/K--; line 72, change "2T/k" to --2T/K--; and line 75, change "g(t)≡f(t+Tk)" to --g(t)≡f(t+TK)--. Column 6, delete line 11 and insert $$--\theta=2^{-i-1}\pi\left[2^{i}k_{m-i}+2^{i-1}k_{m-i+1}+\ldots+2^{1}k_{m-1}\right]--;$$

line 74, change "operans" to --operands--. Column 7, line 10, change "That it" to --That is--; line 18, change "element" to --elements--; lines 40 and 41, change equation (21a) to $$--AR_{i+1}(J)=AR_{i}(J)+$$
$$AR_{i}(K)\cos\theta - AI_{i}(K)\sin\theta--;$$

and lines 42 and 43, change equation (21b) to $$--AI_{i+1}(J)=AI_{i}(J)+$$
$$AI_{i}(K)\cos\theta + AR_{i}(K)\sin\theta--;$$

Column 13, line 4, after "adder" insert --603--; and line 58, change "al" to --all--. Column 14, line 5, change "$yc_{n-k}(ys_{n-k})$" to --$yc_{n-k}$--.

Drawing changes and corrections:

FIG. 2, input to arithmetic unit from indexing circuit requires an arrowhead.

FIG. 4, on real axis, "3 8" should be --3/8--.

FIG. 5, add reference numerals 501 and 502 to left and right circles respectively.

Patent No. 3,517,173 Dated June 23, 1970

Inventors Michael J. Gilmartin, Jr., and Richard R. Shively

FIG. 6, add reference numeral 603 to "BINARY ADDER STAGE" block at center left; add reference numeral 856 and 857 to RESCALE and $\overline{\text{RESCALE}}$ leads respectively; add designation --$USR_{2i}$-- to vertical lead connecting BINARY ADDER STAGE 604 to BINARY ADDER STAGE 603 in left half of FIG.; add designation $\overline{UCR_{2i}}$ to right hand vertical input lead to block 604 in left half of FIG.

FIG. 7A, add reference numeral 603 to enclosing (broken line) rectangle.

SIGNED AND SEALED FEB 2 1971

(SEAL)
Attest:

Edward M. Fletcher, Jr.
Attesting Officer

WILLIAM E. SCHUYLER, Commissioner of Patents